(12) United States Patent
Dugas et al.

(10) Patent No.: US 6,698,736 B2
(45) Date of Patent: Mar. 2, 2004

(54) CLAMPING LOCATOR

(75) Inventors: Michael R. Dugas, Brighton, MI (US); Velibor Kilabarda, Birmingham, MI (US); Fred Zarna, Harrison Township, MI (US); Greg Bildson, Ortonville, MI (US); William J. Maybee, Brighton, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/098,001

(22) Filed: Mar. 14, 2002

(65) Prior Publication Data

US 2002/0135116 A1 Sep. 26, 2002

Related U.S. Application Data (63) Continuation-in-part of application No. 10/044,134, filed on Jan. 10, 2002.
(60) Provisional application No. 60/262,565, filed on Jan. 18, 2001, and provisional application No. 60/278,225, filed on Mar. 23, 2001.

(51) Int. Cl.$^7$ ................................................. B23Q 3/08
(52) U.S. Cl. ........................................... 269/32; 269/49
(58) Field of Search ....................... 269/24, 32, 91–94, 269/228, 233, 232, 229, 237, 234

(56) References Cited

U.S. PATENT DOCUMENTS

| | | | |
|---|---|---|---|
| 2,188,450 A | 1/1940 | Verdon-Roe | |
| 2,377,086 A | 5/1945 | Lang | |
| 3,233,908 A | 2/1966 | Schwarzmayr et al. | |
| 3,414,253 A | 12/1968 | Mewse | |
| 4,564,151 A | 1/1986 | Pali | |
| 5,737,820 A | * 4/1998 | Ferrari et al. | 269/234 |
| 6,102,383 A | 8/2000 | Tunkers | |
| 6,364,300 B1 | 4/2002 | Kita | |
| 6,378,855 B1 | * 4/2002 | Sawdon et al. | 269/32 |
| 6,439,560 B2 | * 8/2002 | Sawada et al. | 269/32 |

FOREIGN PATENT DOCUMENTS

| | | |
|---|---|---|
| EP | 1 055 474 | 11/2000 |
| FR | 2 733 930 | 11/1996 |

* cited by examiner

Primary Examiner—Robert C. Watson
(74) Attorney, Agent, or Firm—Young & Basile, P.C.

(57) ABSTRACT

A clamping and locating fixture includes a hollow body, a pin mountable to the body, a locking arm positionable within the body locatable between two positions and a drive pin moveable within the body to engage the locking arm. A workpiece can be directed to a clamping position by the guide pin. The pin includes an aperture allowing a locking projection of the locking arm to extend therethrough and over a workpiece to clamp the workpiece for a processing operation. The locking projection can be retracted through the aperture while the workpiece is being located or is being removed. The drive pin can be moved within the body to engage a cam follower of the locking arm. The drive pin can be supported during movement by one or more rollers mounted in the body. The drive pin can include a pin body and a pin member moveably associated with one another to selectively define the position of a cam surface.

18 Claims, 7 Drawing Sheets

FIG-11

CLAMPING LOCATOR

CROSS-REFERENCE TO RELATED APPLICATIONS

This application is a continuation-in-part of U.S. patent application pending Ser. No. 10/044,134 for a CLAMPING LOCATOR, filed on Jan. 10, 2002, which claimed the benefit of Provisional Patent Application S. No. 60/262,565 for a LOCKING AND LOCATING PIN, filed on Jan. 18, 2001, and also claimed the benefit of the Provisional Patent Application S. No. 60/278,225 for a CLAMPING LOCATOR, filed on Mar. 23, 2001.

FIELD OF THE INVENTION

The invention relates to an apparatus for engaging a workpiece, and more specifically, the invention provides a clamping locator for retaining an automotive body component.

BACKGROUND OF THE INVENTION

It has been a problem that current configurations of fixturing devices for automotive body components are not as flexible as desired. These current configurations are inoperable to both locate and lock an automotive body component simultaneously with a relatively compact, inexpensive, reliable clamping and locating device. Typically, a fixturing device will have at least one locating guide and at least one clamping or fixturing device.

SUMMARY OF THE INVENTION

The present invention provides an apparatus for clamping and locating a workpiece. The apparatus includes a body having a length and an aperture extending along at least a portion of the length of the body. The invention can also include a guide or guide pin fixedly attached to the body. The guide or wedge has an angled end for engaging a surface on a workpiece. The guide pin has a tapered end for engaging a surface on a workpiece and an open end. The guide, or guide pin, also includes an opening or port extending from a side of the guide, or guide pin, in communication with the aperture of the body. The tapered end of the guide pin allows a workpiece to be precisely positioned over the guide pin in two dimensions. The guide or wedge includes an angled surface for precisely locating a workpiece in a single dimension. The apparatus also includes a locking arm. The locking arm is mounted within the body and is rotatable between an extended clamping position and a retracted disengaged position. The locking arm includes a cam follower and a locking projection. The locking projection extends through the aperture and the open end of the guide, or guide pin. The locking projection is operable to extend through the port of the guide, or guide pin, and is operable to be retracted from the port in response to the locking arm movement between the extended position and the retracted position respectively. When the locking arm is in a locking position, the locking projection extends through the port to clamp a located workpiece. The apparatus also includes a drive pin. The drive pin has a cam surface extending along at least one side of the pin. The pin projects through the aperture of the body. The cam surface operably engages the cam follower of the locking arm to rotate the locking arm between the extended or locked position and the retracted or unlocked position. The apparatus can also include an actuator for extending and retracting the drive pin.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Various embodiments of the present invention are shown throughout the figures. These figures include common elements in different structural configurations. Common elements are designated with a common base numeral and differentiated with an alphabetic designation.

The present invention provides a clamping locator 10 for clamping a workpiece. The clamping locator 10 includes a body 14, guide means 16, a locking arm 18 and a drive pin 20. The guide means 16 can be a locating pin 16a or a locating guide 16b. The guide means 16 can receive a workpiece 12 and guide the workpiece 12 into a precise position. The workpiece 12 can then be locked in position between the body 14 and the locking arm 18 in response to movement of the drive pin 20. When the workpiece 12 has been locked into position, a processing operation can be performed on the workpiece 12.

Figure 2:
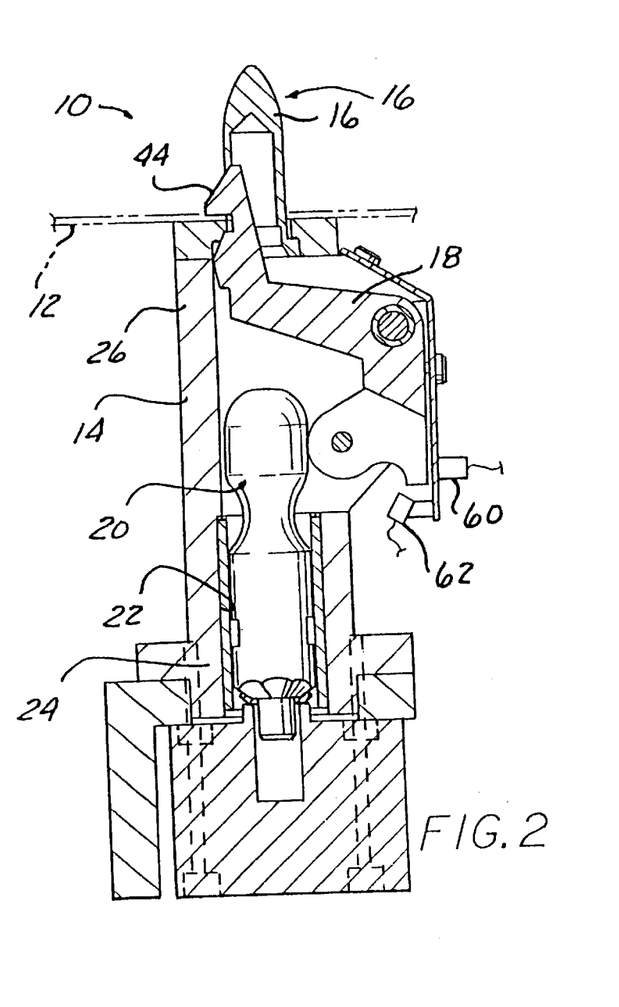
FIG. 2 is a cut away view of the clamping locator of FIG. 1 in a locked position.

The body 14 acts as a base and support for the guide means 16. The body 14 has an aperture 22 extending through at least a portion of the length of the body 14. As shown in FIG. 2, the aperture 22 can have a circular cross section at a first end 24 of the body 14 and a non-circular cross section at a second end 26 of the body 14. The aperture 22 is sized to receive the locking arm 18.

Figure 3:
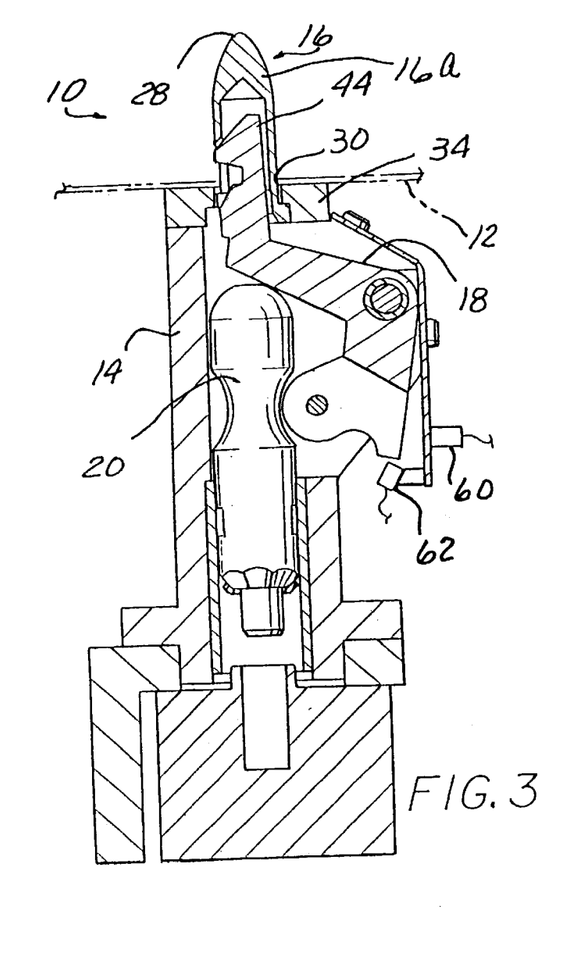
FIG. 3 is a cut away view of the clamping locator of FIG. 1 in an open position.

The guide means 16 can be a locating pin 16a, or a locating guide 16b. As shown in FIG. 3, the guide pin 16a includes a tapered end 28. The tapered end 28 is operable to receive a workpiece 12 having a locating aperture or surface 30. The guide pin 16a has a diameter or shape corresponding to the diameter or shape of the aperture or surface 30 to precisely locate the workpiece in at least two dimensions.

Figure 1:
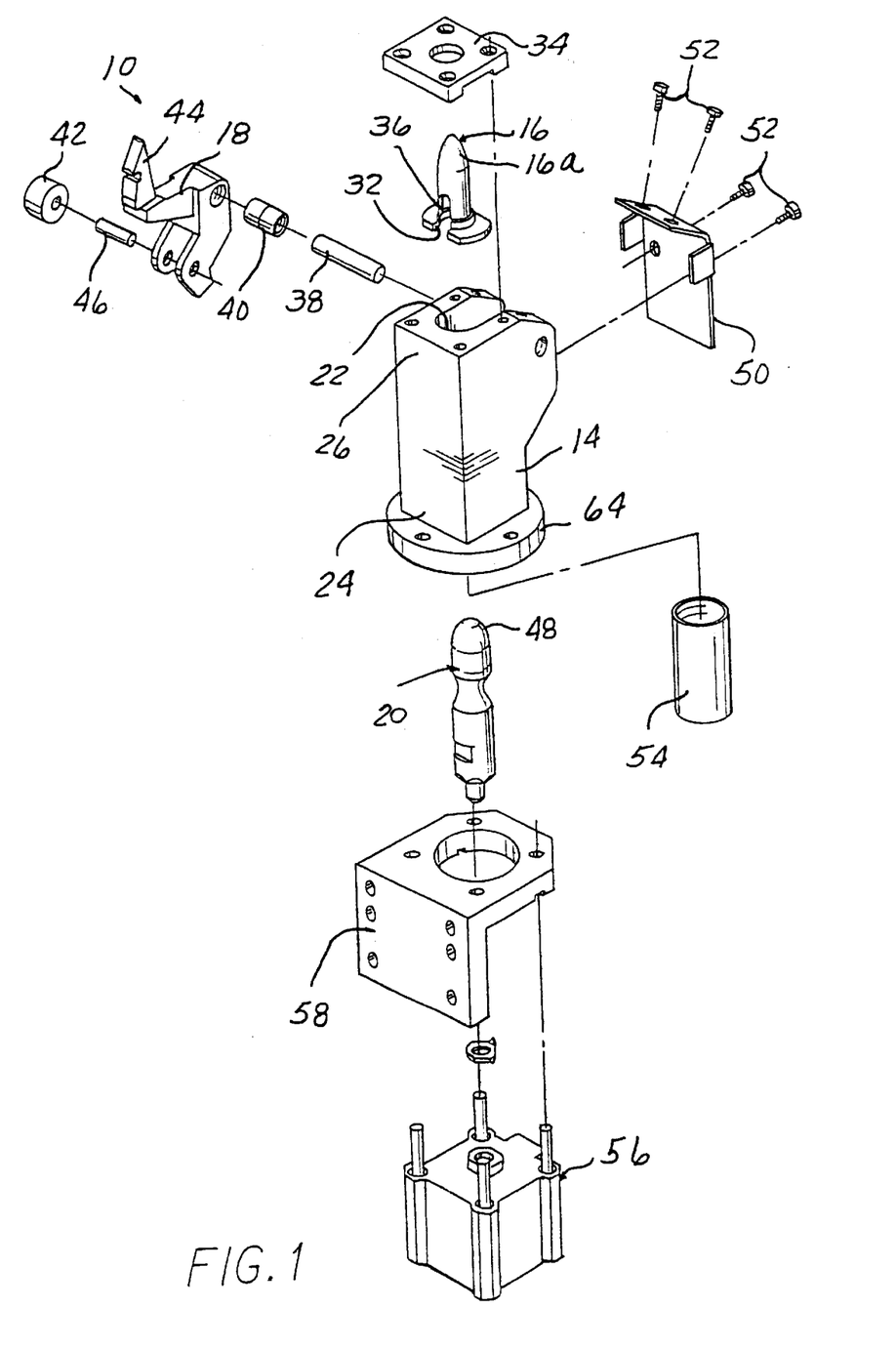
FIG. 1 is an exploded view of a clamping locator with a locating pin according to the present invention.
Figure 4:
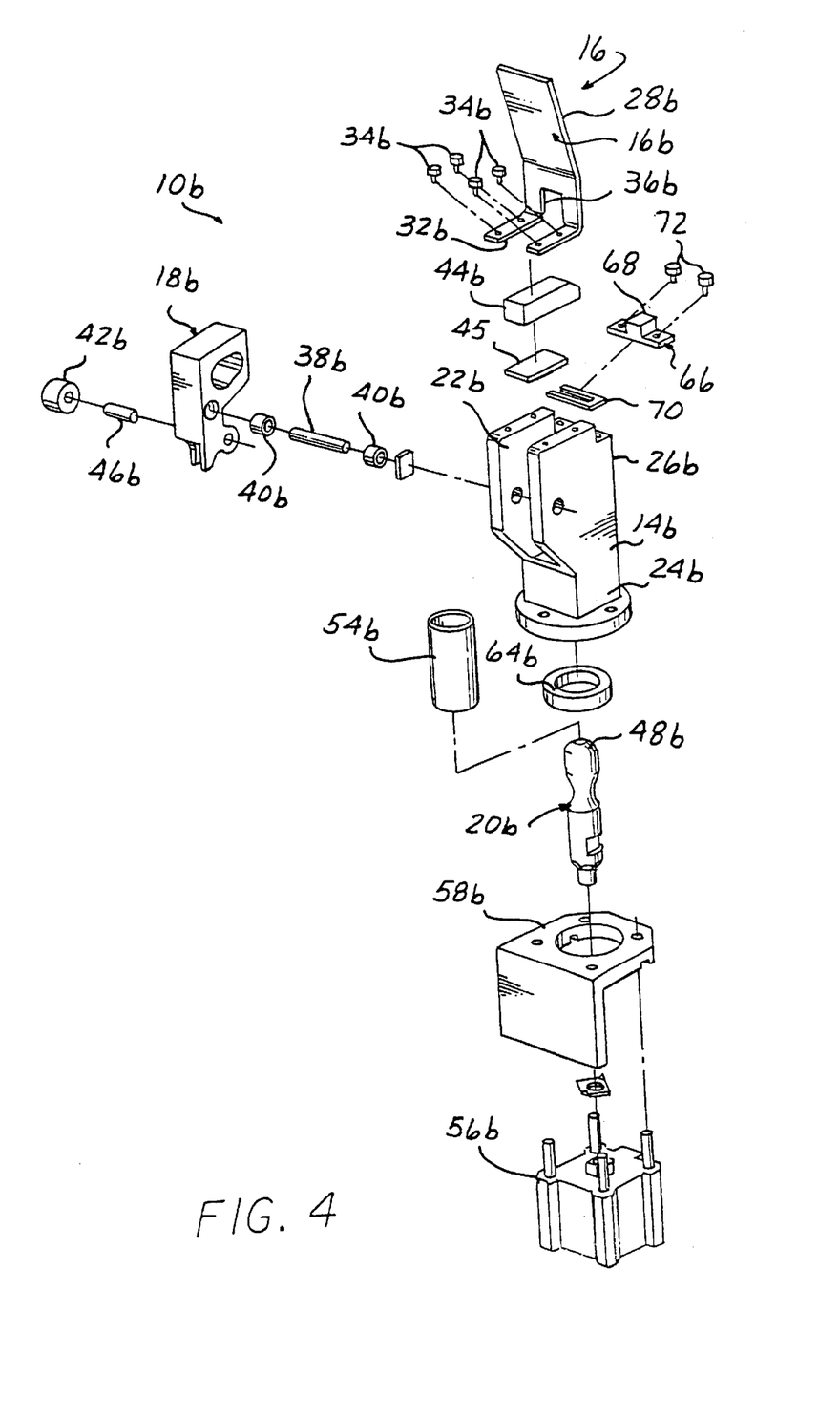
FIG. 4 is an exploded view of a clamping locator with a locating guide or wedge according to the present invention.
Figures 5, 6:
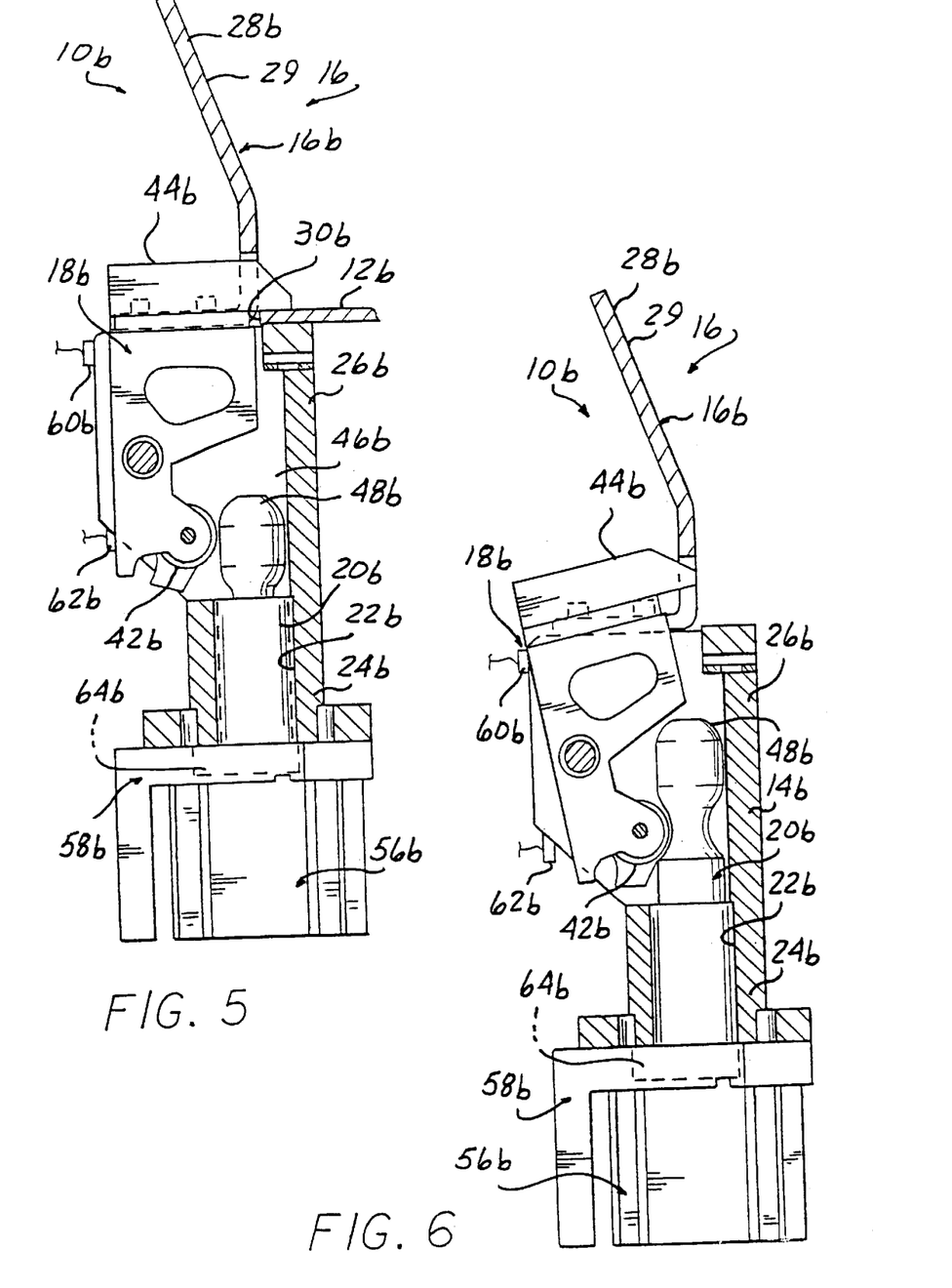
FIG. 5 is a cut away view of the clamping locator of FIG. 4 in a locked position.
FIG. 6 is a cut away view of the clamping locator of FIG. 4 in an open position.

The guide pin 16a also includes an open end 32, as shown in FIG. 1. The open end 32 is positioned communicating with the aperture 22 through the body 14. The guide pin 16a is immovably associated with the body 14. The guide pin 16a can be formed integral with the body 14, can be affixed by welding or soldering, or can be attached to the body 14 with a bracket or replaceable wear pad 34 and suitable fasteners. The guide pin 16a also includes a port 36. The port 36 extends from a side of the guide pin 16a and extends through to the open end 32. The port 36 is formed of appropriate size and shape to allow a locking projection 44 of the locking arm 18 to extend through the port 36. As shown in FIG. 6, the guide means 16 can include a locating guide or wedge 16b having an angled end 28b. The tapered or angled end 28b is operable to receive a workpiece 12b having a locating surface 30b. In operation, the surface 30b engages a surface 29 of the angled end 28b. The workpiece 12b is urged toward the body 14b. The surface 30b follows the surface 29 as the workpiece 12b is urged downward toward the body 14b to precisely locate the workpiece in at least a single dimension. The guide 16b also includes an open end 32b, as shown in FIG. 4. The open end 32b is positioned communicating with an aperture 22b through the body 14b. The body 14b has the aperture 22b extending through the length of the body 14b. As shown in FIG. 4, the aperture 22b can have a circular cross section at a first end 24b of the body 14b and a non-circular cross section at a second end 26b of the body 14b. The aperture 22b is sized to receive the locking arm 18b. The guide or wedge 16b is immovably associated with the body 14b. The guide 16b can be formed integral with the body 14b, can be affixed by welding or soldering, or can be attached to the body 14b with suitable fasteners 34b. The guide 16b also includes a port 36b. The port 36b extends through a side of the guide 16b and extends to the open end 32b. The port 36b is formed of an appropriate size and shape to allow a locking projection 44b of the locking arm 18b to extend through the port 36b.

The clamping locator 10 also includes the locking arm 18. As shown in FIGS. 1–3, the locking arm 18 is mounted in the body 14. As shown in FIG. 1, the locking arm 18 can be mounted on a pin or shaft 38. The locking arm can also be mounted on a bearing 40 mounted on the pin or shaft 38. The locking arm 18 is rotatable relative to the body 14. The locking arm 18 includes a cam follower 42 and a locking or clamping projection 44. The cam follower 42 is positioned within the aperture 22 of the body 14. The cam follower 42 can be integral with the locking arm 18 or can be mounted on the locking arm 18 with a pin or shaft 46. The locking projection 44 of the locking arm 18 extends through the aperture 22, through the open end 32 of the guide 16, and is operable to project through the port 36. The locking projection 44 can be integral with the locking arm 18 or can be a separate component mounted to the locking arm 18. When the clamping locator 10 of the present invention is in a locked position, the locking projection 44 extends through the port 36 to clamp a workpiece in position. As shown in FIG. 2, the locking projection 44 can clamp a workpiece 12 between the locking projection 44 and the body 14. When the clamping locator 10 of the present invention is in an unlocked position, the locking projection 44 is retracted internally relative to the pin 16. As shown in FIG. 3, the locking projection 44 can be retracted internally relative to the guide means 16.

As shown in FIGS. 4–6, the locking arm 18b can be mounted on a pin or shaft 38b. The locking arm can also be mounted on a bearing 40b mounted on the pin or shaft 38b. The locking arm 18b is rotatable relative to the body 14b.

The locking arm 18b includes a cam follower 42b and a locking projection 44b. The cam follower 42b is positioned within the aperture 22b of the body 14b. The cam follower 42b can be integral with the locking arm 18b or can be mounted on the locking arm 18b with a pin or shaft 46b. The locking projection 44b of the locking arm 18b extends through the aperture 22b, through the open end 32b of the guide 16b, and is operable to project through the port 36b to clamp the workpiece between the projection 44b and the body 14b. When the clamping locator 10b of the present invention is in a locked position, the locking projection 44b extends through the port 36b. When the clamping locator 10b of the present invention is in an unlocked position, the locking projection 44b is retracted to an opposite side of the guide 16 relative to the surface 29 of the guide or wedge 16b. As shown in FIG. 5, the locking projection 44b can clamp a workpiece 12b between the projection 44b and the replaceable wear pad 66. As shown in FIG. 6, the locking projection 44b can be retracted out of the port 36b. The locking projection 44b can be integral with the locking arm 18b or can be a separate component mounted to the locking arm 18b. The locking arm 18b can include a gauge or spacer block 45 to mount the locking projection 44b. A plurality of differently sized blocks 45 can accommodate a plurality of different gauge metal sheet workpieces 12. In other words, the spacer block 45 can be changed to accommodate different thicknesses of workpieces to be clamped in the clamping locator 10 according to the present invention.

The clamping locator 10 also includes a drive pin 20. The drive pin 20 is extendable in the aperture 22 of the body 14 between a first position and a second position. The drive pin 20 extends in the aperture 22 from the first end 24 toward the second end 26. The drive pin 20 includes a cam surface 48 for engaging the cam follower 42. The drive pin 20 is extendable between at least two positions in the aperture 22. FIG. 2 shows the drive pin 20 in a generally retracted position within the aperture 22. FIG. 3 shows the drive pin 20 in a generally extended position within the aperture 22.

The body 14 can be operable to receive an individual locking arm 18 chosen from a plurality of differently configured locking arms. The aperture 22 can be opened by removing a cover 50. When the cover 50 is removed, the pin or shaft 38 can be removed and the locking arm 18 can also be removed. A second locking arm can be inserted into the body 14. The cover 50 can be mounted to the body 14 with fasteners 52. The body 14 can also include a sleeve 54. The sleeve 54 can be desirable to reduce friction between the extendable drive pin 20 and the body 14. The body 14 can also include a first sensor 60 and a second sensor 62 for sensing a position of the locking arm 18. As shown in FIG. 2, a first sensor 60 can sense the locking arm 18 in the extended, clamped position. As shown in FIG. 3, a second sensor 62 can sense the locking arm 18 in the retracted or released position.

The clamping locator 10 of the present invention can also include an actuator 56. The actuator 56 can be operably associated with the drive pin 20 to extend and retract the drive pin 20. The actuator 56 can be a fluid operated actuator such as a hydraulic or pneumatic cylinder, or an electric actuator such as a roller screw drive or a standard screw drive. The body 14 can be mounted to the actuator 56 with a bracket 58 and base 64 or a locking ring 64b. The bracket 58 can also be operable to mount the clamping locator 10 to another component of a work station.

The clamping locator 10b of the present invention can also include a mounting block or replaceable wear pad 66.

The wear pad 66 is replaceably mounted with respect to the body 14b. The workpiece 12b is clamped between a wear surface 68 of the wear pad 66 and the replaceable locking projection 44b. The wear pad 66 can be mounted to the body 14b with fasteners 72. A spacer element 70 can be positioned between the wear pad 66 and the body 14b to adjust the precise locating position of the wear pad 66 relative to the locking projection 44b when the clamping locator 10b is in an extended, clamped position as show in FIG. 5.

Figure 7:
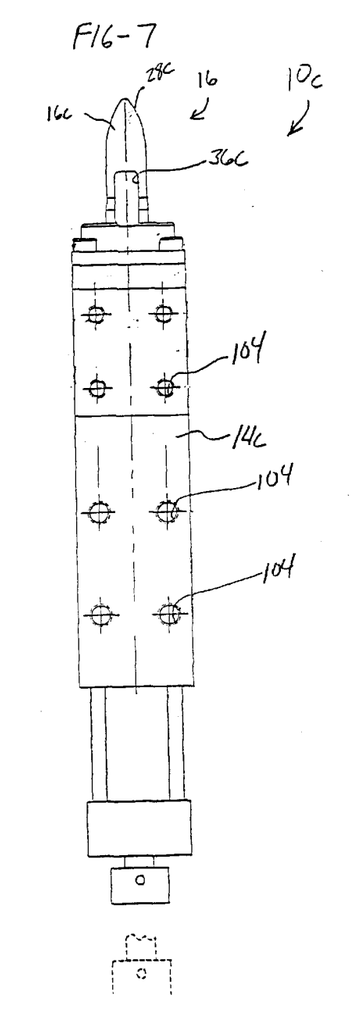
FIG. 7 is a left-hand plan view of a clamping locator according to an embodiment of the invention.
Figure 8:
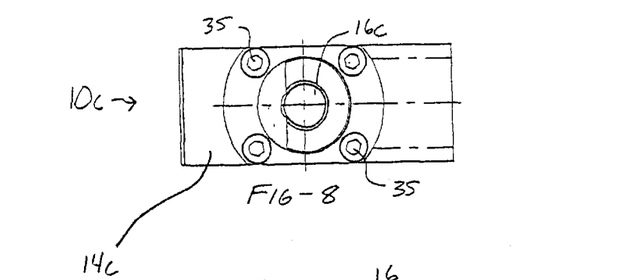
FIG. 8 is a top plan view of the clamping locator of FIG. 7.
Figure 9:
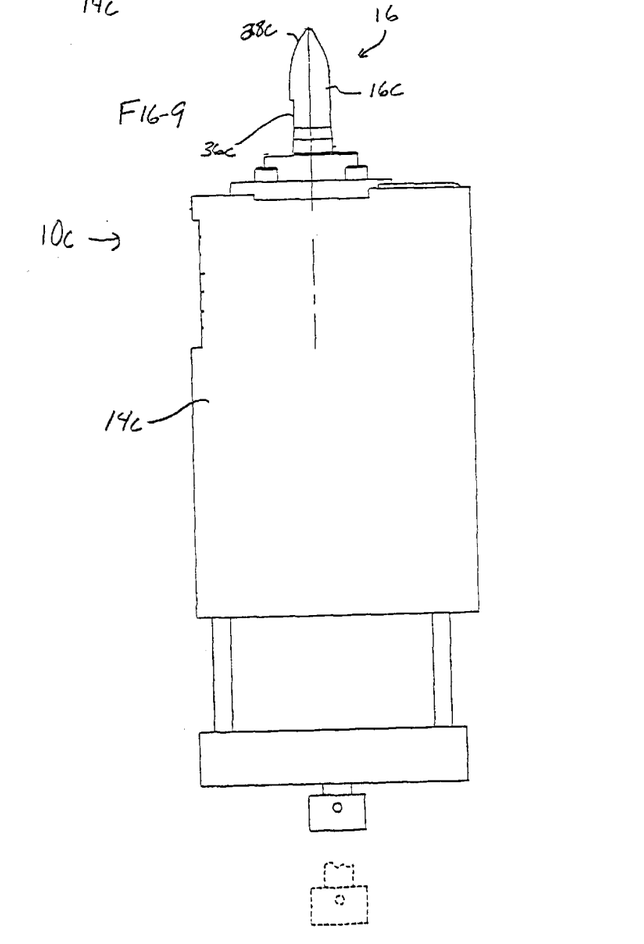
FIG. 9 is a front plan view of the clamping locator of FIG. 7.

Referring now to FIGS. 7–9, the present invention provides a clamping locator 10c for clamping a workpiece. The clamping locator 10c includes a body 14c and guide means 16. The guide means 16 can receive a workpiece and guide the workpiece into a clamping position. The body 14c acts as a base and support for guide means 16. The guide means 16 can be a locating pin 16c including a tapered end 28c. The tapered end 28c is operable to receive a workpiece 12c having a locating aperture 30c, best seen in FIG. 11. The locating pin 16c has a diameter or shape corresponding to the diameter or shape of the aperture to locate the workpiece in at least two dimensions at the clamping position. The locating pin 16c is removably associated with the body 14c. The locating pin 16c can be formed integral with the body 14c, can be affixed by welding or soldering, or can be attached to the body 14c with suitable fasteners 35. The locating pin 16c also includes a port 36c. The port 36c extends from a side of the locating pin 16c. The port 36c is formed of appropriate size and shape to allow a locking projection to extend through the port 36c.

Figure 10:
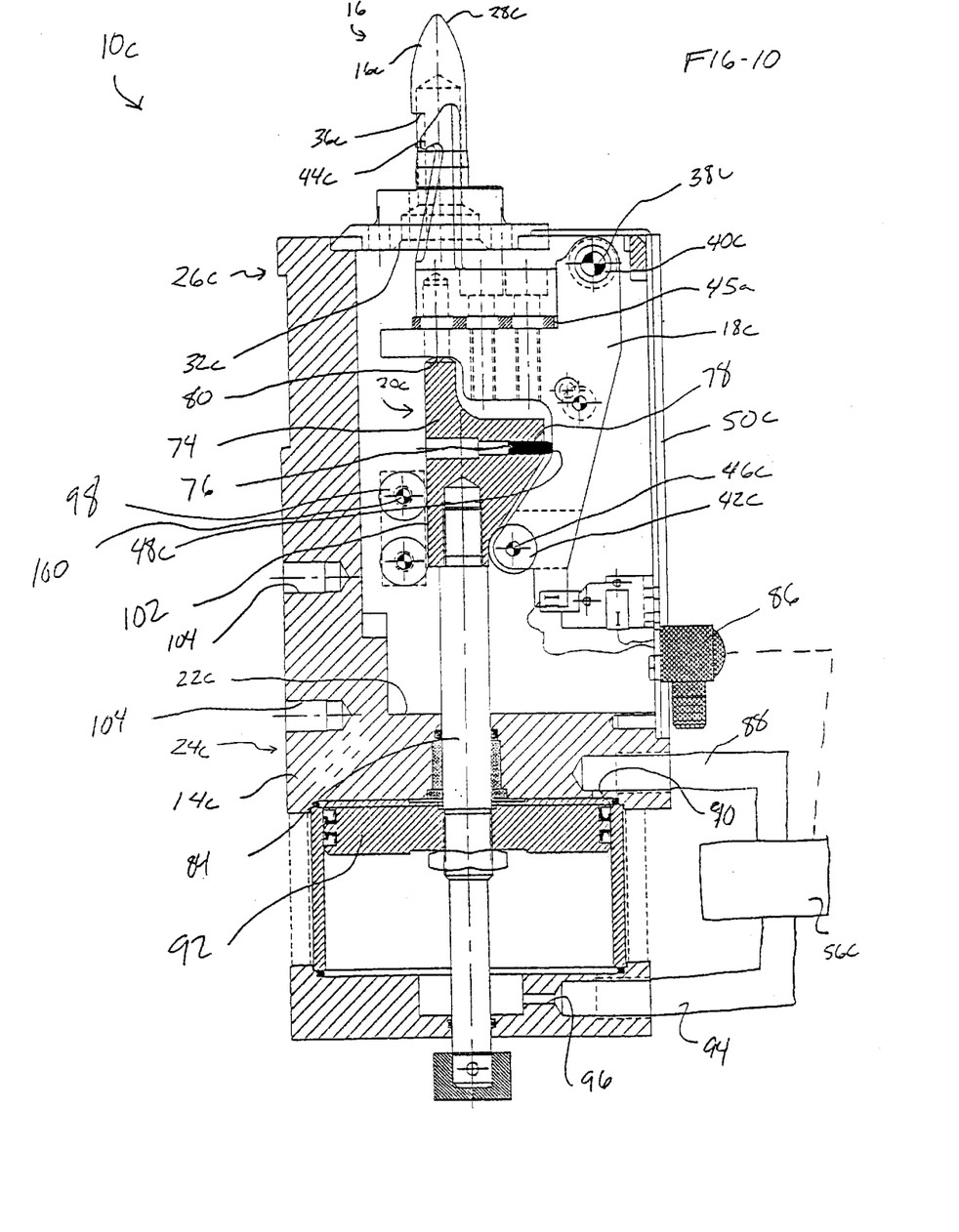
FIG. 10 is a cutaway view of the clamping locator of FIG. 7 where the projection is in a retracted position.
Figure 11:
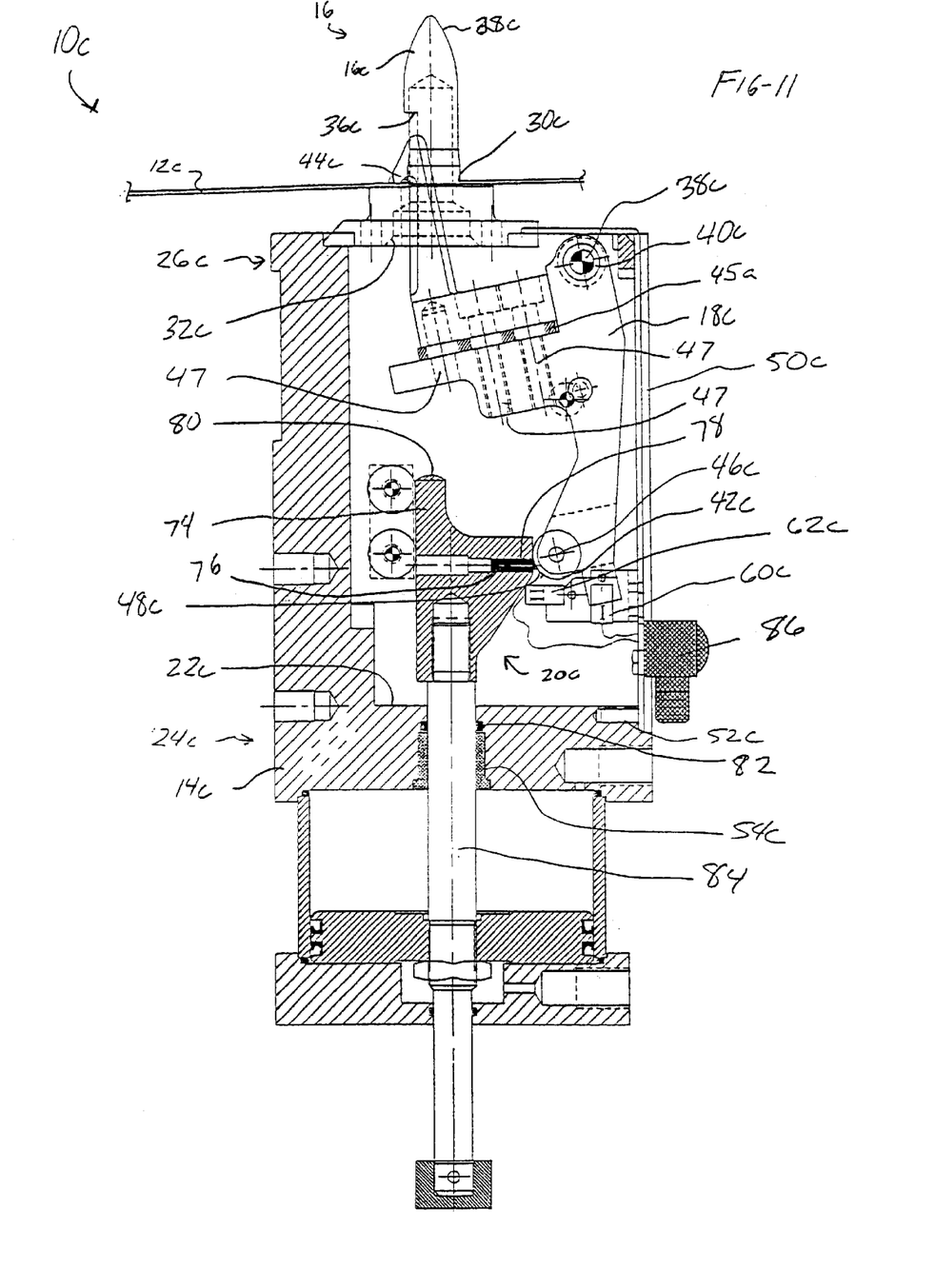
FIG. 11 is a cutaway view of the clamping locator of FIG. 7 where the projection is in an extended position.

Referring now to FIGS. 10–11, the clamping locator 10c can also include a locking arm 18c and a drive pin 20c. The locking arm 18c is rotatable to the locating pin 16c. A workpiece 12c can be received by the locating pin 16c and locked in position between the body 14c and the locking arm 18c in response to movement of the drive pin 20c to drive the locking arm 18c to rotate. When the workpiece 12c has been locked into position, a processing operation can be performed on the workpiece 12c.

The body 14c has an aperture 22c extending through at least a portion of the body 14c. The aperture 22c can have a circular cross-section at a first and 24c of the body 14c and a non-circular cross-section and a second end 26c of the body 14c. The aperture 22c is sized to receive the locking arm 18c and allow a predetermined range of rotation of the locking arm 18c. The body 14c can also include one or more mounting apertures 104 to releasibly mount the clamping locator 10c at a workstation.

The locating pin 16c also includes an open end 32c. The open end 32c is positioned communicating with the aperture 22c of the body 14c. The port 36c extends from the side of the locating pin 16c to the open end 32c.

The locking arm 18c can be mounted in the body 14c. The locking arm 18c can be mounted on a shaft 38c for rotation about the shaft 38c. The locking arm 18c can also be mounted on a bearing 40c mounted on the shaft 38c. The locking arm 18c also includes a cam follower 42c positioned within the aperture 22c of the body 14c. The cam follower 42c can be integral with the locking arm 18c or can be a roller mounted on the locking arm 18c with a shaft 46c.

The clamping locator 10c also includes a projection 44c. The projection 44c can extend through the port 36c to clamp the workpiece 12c. The port 36c is formed of appropriate size and shape to allow the locking projection 44c to extend through the port 36c. The locking projection 44c also extends through the opening 32c of the locating pin 16c. The locking projection 44c can be integral with the locking arm 18c or can be engaged with the locking arm 18c with fasteners 47. A gauge or spacer block 45a can be disposed between the projection 44c and the locking arm 18c. When the clamping locator 10c of the present invention is in a locked or clamped position, the locking projection 44c extends through the port 36c to clamp the workpiece in position as best shown in FIG. 11. When the clamping locator 10c of the present invention is in an unlocked or clamped position, the locking projection 44c is retracted internally relative to the locating pin 16c as best shown in FIG. 10. A plurality of differently sized spacer blocks 45a can accommodate a plurality of different gauge metal sheet workpieces 12c. In other words, the spacer block 45a can be changed to accommodate different thicknesses of workpieces to be clamped in the clamping locator 10c according to the present invention.

The clamping locator 10c also includes a drive pin 20c. The drive pin 20c is moveable in the aperture 22c of the body 14c between a first end limit of travel and a second end limit of travel to move the locking arm 18c. The first end limit of travel corresponds to a retracted position of the projection 44c and is shown in FIG. 10. The second end limit of travel corresponds to an extended position of the projection 44c and is shown in FIG. 11. The first end limit of travel is closer to the second end 26c of the body 14c and the second end limit of travel is closer to the first end 24c of the body 14c.

The drive pin 20c can include a pin body 74 and a pin member 76. The pin member 76 can be moveably associated with the pin body 74 and define a cam surface 48c. The pin member 76 can be threaded and engaged with a threaded aperture 78 of the pin body 74. The pin member 76 can be rotated in the threaded aperture 78 as desired to selectively position the cam surface 48c relative to the pin body 74. In other words, the cam surface 48c can be selectively positioned to control an angle of rotation of the locking arm 18c. The drive pin 20c can also include a drive surface 80 for engaging the locking arm 18c to move the locking arm to a first position corresponding to the retracted position of the projection 44c as shown in FIG. 10.

The body 14c can be operable to receive an individual locking arm 18c chosen from a plurality of differently configured locking arms. The aperture 22c can be opened by removing a cover 50c. When the cover 50c is removed, the pin or shaft 38c can be removed and the locking arm 18c can also be removed. The second locking arm can be inserted into the body 14c. Cover 50c can be mounted to the body 14c with fasteners 52c. The body 14c can also include a sleeve 54c and a gasket 82. The sleeve 54c can be desirable to reduce friction between a shaft 84 of an actuator 56c and the body 14c.

The clamping actuator 10c of the present invention can also include a first sensor 60c and a second sensor 62c for sensing a position of the locking arm 18c. The first sensor 60c can sense the locking arm 18c in the extended or clamped position. The second sensor 62c can sense the locking arm 18c in the retracted or released position. The sensors can communicate a signal corresponding to a position of the locking arm 18c to a controller 86. The controller 86 can receive the signals from the sensors and control an actuator 56c for moving the pin 20c. The controller 86 can receive the signals from the sensors and determine the position of projection 44c relative to the port 36c based on the position of the locking arm 18c.

The clamping locator 10c of the present invention can also include actuator 56c. The actuator is schematically shown in FIG. 10. The actuator 56c can be operably associated with the drive pin 20c to extend and retract the drive pin 20c. The actuator 56c can be a fluid operated actuator such as an hydraulic or pneumatic cylinder, or an electric actuator such as a roller screw drive or a standard screw drive. The body 14c can be mounted to the actuator 56c or the actuator 56c can be substantially integral with the body 14c. The actuator 56c can direct a fluid stream through a first passage 88 and a port 90 to displace a piston 92 and move the drive pin 20c to the second end limit of travel corresponding to an extended position of the projection 44c, or a clamped position of the clamping locator 10c. The actuator 56c can direct a fluid stream through a second passage 94 and a port 96 to displace the piston 92 and move the drive pin 20c to the first end limit of travel corresponding to a retracted position of the projection 44c, or an unclamped position of the clamping locator 10c.

The clamping locator 10c of the present invention can also include means for supporting the drive pin 20c during movement between the first and second end limits of travel. The supporting means can include at least one roller 98 mounted in the aperture 22c of the body 14c on a pin 100. The roller 98 can engage a first surface 102 of the drive pin 20c. The supporting means can include a plurality of rollers to support the drive pin 20c. Preferably, the support means supports the drive pin 20c along an entire path of movement of the drive pin 20c. Preferably, support means is disposed in the aperture 22c such that the drive pin 20c is substantially between support means and the cam follower 42c of the locking arm 18c.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a clamping locator for holding a workpiece, the clamping locator including a clamp moveable between a clamped position and a released position, the improvement comprising:
   a reciprocal drive member having a cam surface formed along an external peripheral surface of the drive member;
   a driven member supporting a cam follower operably engagable with the cam surface of the drive member, the driven member operably associated with the clamp for driving the clamp between the clamped position and the released position in response to reciprocal movement of the drive member between first and second end limits of travel; and
   first and second rollers supporting the drive member during movement between first and second end limits of travel by engaging an external surface of the drive member opposite from the cam surface.

2. The improvement of claim 1 further comprising the driven member pivotable about an axis of rotation and the cam follower spaced from the axis of rotation of the driven member.

3. The improvement of claim 2 further comprising:
   the reciprocal drive member moveable along an axis offset and perpendicular to the axis of rotation of the driven member.

4. The improvement of claim 2 further comprising:
   the drive member having a drive surface engagable with the driven member for rotating the driven member toward a first angular position corresponding to a released position of the clamp as the drive member moves toward the first end limit of travel.

5. The improvement of claim 1 further comprising:
   the drive member having a drive surface engagable with the driven member for moving the driven member toward a first position corresponding to a released position of the clamp as the drive member moves toward the first end limit of travel.

6. The improvement of claim 1 further comprising:
   the reciprocal drive member moveable along an axis toward and away from the clamp.

7. A clamping locator for holding a workpiece comprising:
   a clamp moveable between a clamped position and a released position;
   a reciprocal drive member having a cam surface formed along an external peripheral surface of the drive member;
   a driven member supporting a cam follower operably engagable with the cam surface of the drive member, the driven member operably associated with the clamp for driving the clamp between the clamped position and the released position in response to reciprocal movement of the drive member between first and second end limits of travel; and
   first and second rollers supporting the drive member during movement between first and second end limits of travel by engaging an external surface of the drive member opposite from the cam surface.

8. The clamping locator of claim 7 further comprising the driven member pivotable about an axis of rotation and the cam follower spaced from the axis of rotation of the driven member.

9. The clamping locator of claim 8 further comprising:
   the reciprocal drive member moveable along an axis offset and perpendicular to the axis of rotation of the driven member.

10. The clamping locator of claim 8 further comprising:
    the drive member having a drive surface engagable with the driven member for rotating the driven member toward a first angular position corresponding to a released position of the clamp as the drive member moves toward the first end limit of travel.

11. The clamping locator of claim 7 further comprising:
    the drive member having a drive surface engagable with the driven member for moving the driven member toward a first position corresponding to a released position of the clamp as the drive member moves toward the first end limit of travel.

12. The clamping locator of claim 7 further comprising:
    the reciprocal drive member moveable along an axis toward and away from the clamp.

13. A clamping locator for holding a workpiece comprising:
    a clamp moveable between a clamped position and a released position;
    a reciprocal drive member having a cam surface formed along an external peripheral surface of the drive member;
    a driven member supporting a cam follower operably engagable with the cam surface of the drive member, the driven member operably associated with the clamp for driving the clamp between the clamped position and the released position in response to reciprocal movement of the drive member between first and second end limits of travel, the drive member having a drive surface engagable with the driven member for moving the driven member toward a first position corresponding to a released position of the clamp as the drive member moves toward the first end limit of travel;

at least one sensor for sensing at least one position of the driven member as the drive member moves between the first and second end limits of travel; and a guide surface positioned with respect to the clamp for guiding a workpiece to be clamped into a clamping position, the guide surface having an aperture extending therethrough allowing passage of the clamp to engage the workpiece to be clamped when moved to the clamped position.

14. The clamping locator of claim 13 further comprising:

the driven member pivotable about an axis of rotation, the cam follower spaced from the axis of rotation of the driven member, and the reciprocal drive member moveable along an axis offset and perpendicular to the axis of rotation of the driven member.

15. The clamping locator of claim 13 further comprising:

the reciprocal drive member moveable along an axis toward and away from the clamp.

16. The clamping locator of claim 13 further comprising:

first and second rollers supporting the drive member during movement between first and second end limits of travel, the first and second rollers engaging an external surface of the drive member opposite from the cam surface.

17. A clamping locator for holding a workpiece comprising:

a clamp moveable between a clamped position wad a released position;

a reciprocal drive member having a cam surface formed along an external peripheral surface of the drive member;

first and second rollers supporting the drive member during movement between first and second end limits of travels the first and second rollers engaging an external surface of the drive member opposite from the cam surface;

a driven member supporting a cam follower operably engagable with the cam surface of the drive member, the driven member operably associated with the clamp for driving the clamp between the clamped position and the released position en response to reciprocal movement of the drive member between first and second and limits of travel, the drive member having a drive surface engagable with the driven member for moving the driven member toward a first position corresponding to a released position of the clamp as the drive member moves toward the first end limit of travel, wherein the driven member is pivotable about an axis of rotation, the cam follower is spaced from the axis of rotation of the driven member, and the reciprocal drive member is moveable along an axis offset and perpendicular to the axis of rotation of the driven member;

at least one sensor for sensing at least one position of the driven member as the drive member moves between the first and second end limits of travel; and a guide surface positioned with respect to the clamp for guiding a workpiece to be clamped into a clamping position, the guide surface having an aperture extending therethrough allowing passage of the clamp to engage the workpiece to be clamped when moved to the clamped position.

18. The clamping locator of claim 17 further comprising:

the reciprocal drive member moveable along an axis toward and away from the clamp.

* * * * *

UNITED STATES PATENT AND TRADEMARK OFFICE
CERTIFICATE OF CORRECTION

PATENT NO. : 6,698,736 B2
APPLICATION NO. : 10/098001
DATED : March 2, 2004
INVENTOR(S) : Michael R. Dugas et al.

It is certified that error appears in the above-identified patent and that said Letters Patent is hereby corrected as shown below:

On the title page item [75], Delete "Velibor Kilabarda" and replace with -- Velibor Kilibarda --.

Signed and Sealed this

Nineteenth Day of February, 2008

JON W. DUDAS
*Director of the United States Patent and Trademark Office*